US012202364B2

(12) United States Patent
Lei et al.

(10) Patent No.: US 12,202,364 B2
(45) Date of Patent: Jan. 21, 2025

(54) SYSTEMS AND METHODS FOR ELECTRIC AUTONOMOUS VEHICLE CHARGING ASSISTANCE ON THE ROAD

(71) Applicant: Ford Global Technologies, LLC, Dearborn, MI (US)

(72) Inventors: Oliver Lei, Windsor (CA); Fahad Liaqat, Novi, MI (US); Joe Stanek, Northville, MI (US); Allen R. Murray, Lake Orion, MI (US); Sikder Imam, Novi, MI (US); Daniel Robert Taylor, Gross Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 358 days.

(21) Appl. No.: 17/649,596

(22) Filed: Feb. 1, 2022

(65) Prior Publication Data
US 2023/0241992 A1    Aug. 3, 2023

(51) Int. Cl.
*B60L 58/12* (2019.01)
*B60L 53/12* (2019.01)
(Continued)

(52) U.S. Cl.
CPC .............. *B60L 53/36* (2019.02); *B60L 53/12* (2019.02); *B60L 53/305* (2019.02); *B60L 58/12* (2019.02); *B60W 60/0025* (2020.02)

(58) Field of Classification Search
CPC .... B60L 2260/32; B60L 53/12; B60L 53/305; B60L 53/36; B60L 53/57; B60L 53/66; B60L 53/67; B60L 58/12; B60W 60/0025; G01C 21/3469; G06Q 10/02; G06Q 10/047; G06Q 10/0631; G06Q 50/06; G06Q 50/40; G08G 1/096725; G08G 1/096791;
(Continued)

(56) References Cited

U.S. PATENT DOCUMENTS 10,562,406 B2    2/2020  Williams et al.
10,828,999 B1    11/2020 Konrardy et al.
(Continued)

OTHER PUBLICATIONS

Binod Vaidya et al., Wireless Charging System for Connected and Autonomous Electric Vehicles, School of Electrical Engineering and Computer Science, University of Ottawa, IEEE 2018, six pages.
(Continued)

*Primary Examiner* — Matthew J. Reda
(74) *Attorney, Agent, or Firm* — Emily Drake; Eversheds Sutherland (US) LLP

(57) ABSTRACT

Systems and methods for in-transit charging of an electric vehicle. An electric autonomous vehicle (EAV) may request charging services when its battery level falls below a threshold. The EAV may be in transit to a destination when the charging service is requested. A charging range route may be determined for the EAV. A charging-AV may identify one or more candidate merge points. If a feasible merge point is identified, the charging-AV may transit to the merge point and platoon with the EAV. The EAV and charging-AV may platoon with each other so that the charging-AV may provide charging services to the EAV. Vehicle-to-vehicle (V2V) communications may be used to synchronize the moments of the charging-AV and EAV while in transit.

1 Claim, 5 Drawing Sheets

(51) Int. Cl.
*B60L 53/30* (2019.01)
*B60L 53/36* (2019.01)
*B60W 60/00* (2020.01)

(58) Field of Classification Search
CPC ....... G08G 1/096827; G08G 1/096838; G08G 1/202; G08G 1/22; Y02T 10/70; H04B 5/79
See application file for complete search history.

(56) References Cited

U.S. PATENT DOCUMENTS

| | | | | |
|---|---|---|---|---|
| 2012/0271758 | A1* | 10/2012 | Jammer | G07F 15/003 |
| | | | | 701/22 |
| 2016/0129793 | A1* | 5/2016 | Cronie | H02J 50/90 |
| | | | | 320/109 |
| 2018/0211546 | A1* | 7/2018 | Smartt | H04W 4/38 |
| 2019/0255963 | A1* | 8/2019 | Goei | B60L 53/68 |
| 2020/0009982 | A1* | 1/2020 | Kim | B60L 53/66 |
| 2020/0282857 | A1* | 9/2020 | Mortensen | B60L 53/16 |
| 2020/0317084 | A1* | 10/2020 | Schaffer | B60L 53/305 |
| 2020/0376972 | A1* | 12/2020 | Martin | B60L 53/57 |
| 2021/0081624 | A1 | 3/2021 | Kovarik et al. | |
| 2023/0052717 | A1* | 2/2023 | Harris | H04W 4/024 |
| 2023/0415784 | A1* | 12/2023 | Roy | B60L 53/665 |

OTHER PUBLICATIONS

Peng Liu et al., Efficient Electric Vehicles Assignment for Platoon-Based Charging, IEEE Wreless Communications and Networking Conference, 2019, six pages.

* cited by examiner

SYSTEMS AND METHODS FOR ELECTRIC AUTONOMOUS VEHICLE CHARGING ASSISTANCE ON THE ROAD

BACKGROUND

Electric autonomous vehicles (EAVs) use batteries to provide ride services to customers. EAVs may be in continuous use, for example, driving a passenger to his or her intended destination or driving to a location to pick-up a passenger. While EAVs are more environmentally friendly than gasoline-based vehicles, there are various challenges that arise in the use of EAVs. For example, an EAV's battery will need to be charged after a certain amount of use and in many cases, the amount of time needed to charge an EAV's battery is significantly longer than the amount of time it takes to re-fuel a gasoline-based vehicle. Passengers may find it highly disruptive to have their rides interrupted or delayed by having to wait at a charging station. Using a charging station between rides may also be disadvantageous, as it reduces the overall capacity of a fleet of EAVs to deliver passengers to their intended destinations. Accordingly, more efficient mechanisms to charge EAVs are desirable.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
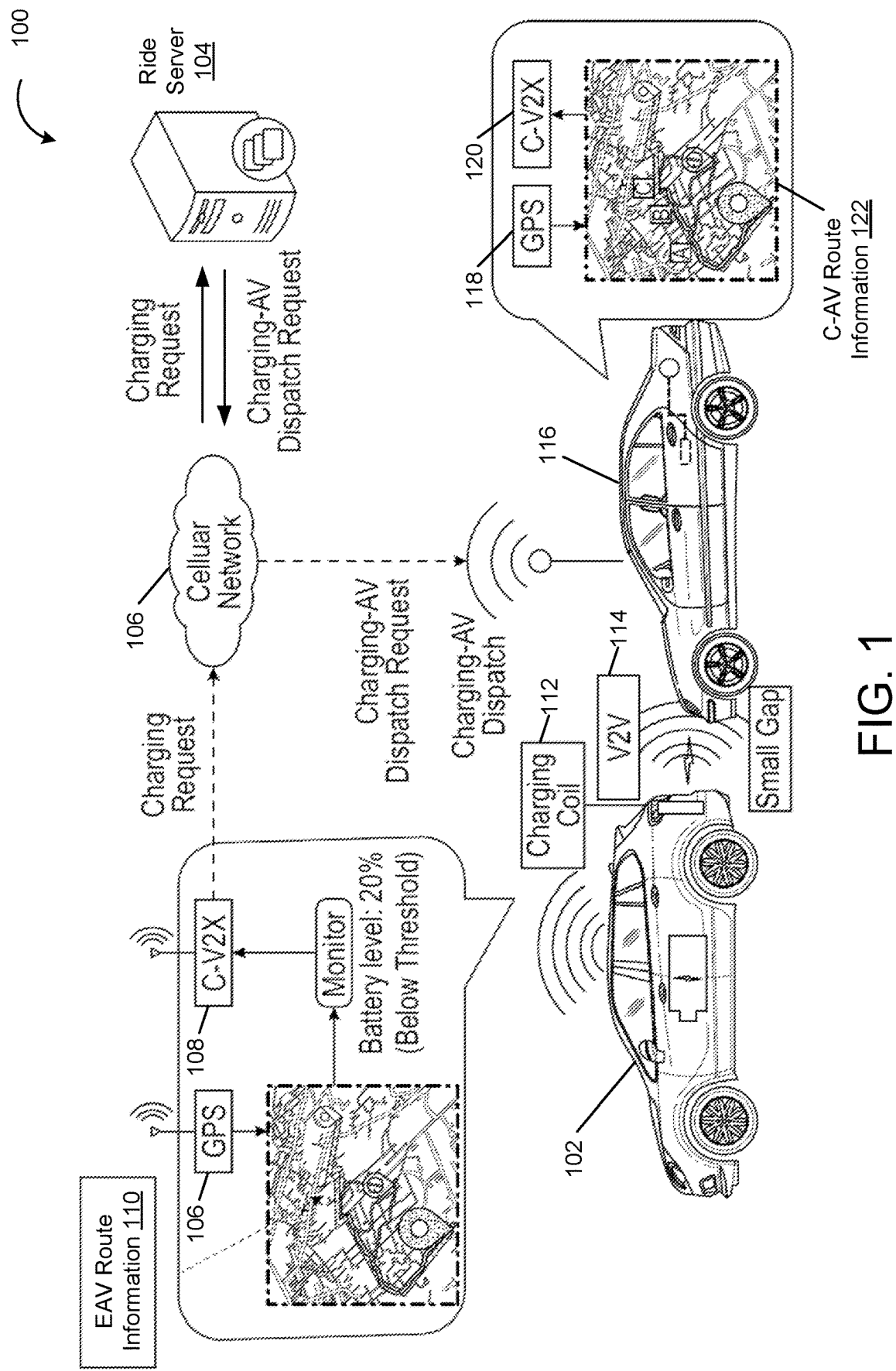
FIG. 1 illustrates an example architecture where the systems and method of the present disclosure may be practiced.

The present disclosure is directed to systems and methods of electric autonomous vehicle (EAV) charging assistance on the road. In various environments, EAVs provide ride services to customers. EAVs may be in continuous use, for example, driving a passenger to his or her intended destination or driving to a location to pick-up a passenger. However, battery-powered EAVs will eventually need to be recharged. In many cases, the amount of time needed to charge an EAV's battery is significantly longer than the amount of time it takes to re-fuel a gasoline-based vehicle. As a result, passengers may find it highly disruptive to have their rides interrupted or delayed by having to wait at a charging station if an EAV falls below a critical battery level. Using a charging station between rides reduces the overall capacity of a fleet of EAVs to deliver passengers to their intended destinations. Accordingly, more efficient mechanisms to charge EAVs are desirable. In various embodiments described herein, EAVs are charged by a ride server that dispatches a charging autonomous vehicle (charging-AV or CAV) to platoon with an EAV while the EAV is providing a ride service. The dispatch can be realized via a cellular network by a ride server. The charging method can be wireless or plug in technologies, for example. The CAV can calculate a feasible route to merge into the EAV's route, thereby minimizing the disruption to the passenger's ride. The EAV and CAV can work together via V2V communications to maintain a close distance for physical and/or wireless charging. In various embodiments, the EAV determines a target speed at which it will travel and transmits the target speed to the C-AV. The C-AV may attempt to follow the EAV at a target distance and maintain the same target speed. The target distance may refer to any suitable distance between EAV and C-AV that maintains safety while also provides for efficient charging. For example, the distance between the two vehicles may be 1 meter, 2 meters, 3, meters, 4 meters, 5 meters, 10 meters, and so forth. In some cases, the distance may be zero, such as in the case where the EAV and C-AV are physically coupled for charging. Accordingly, and in at least one embodiment, an EAV ride service is uninterrupted and an EAV can be charged to allow for continuous deployment and use within a fleet of ride share EAVs.

An EAV may refer to an EAV within a fleet of EAVs that is used to provide ride services, delivery services, and so forth. An EAV may be in communication with a ride server via a communications network such as a cellular network. The ride server may be used to coordinate the activities of various EAVs and deploy EAVs, CAVs, and other mobile resources. An EAV may determine a planned ride route using a navigation system such as a global positioning system (GPS) system. Additional information regarding road conditions may be used to determine an appropriate route based on various factors such as distance, traffic, time, cost (e.g., use or avoidance of toll roads) and so forth. As part of determining the route, the EAV may calculate or estimate an amount of power or battery needed by the EAV. In some cases, if the EAV's available battery or power level is not sufficient to complete the entire planned route, the EAV may send a charging request to the ride server. As part of the charging request, the EAV may provide the full route information and charging information. The charging information may include, for example, a portion of the full route that the EAV is able to traverse based on its current battery level. The EAV may provide battery level and usage information such as the current battery level, current drain rate, and so forth. Information regarding current road condition, environment, A/C usage, etc. may be used to estimate how long the EAV's battery is expected to last and/or how far the EAV is able to travel before receiving charging services. The ride server may send a charging-AV dispatch request to a charging-AV (CAV) along with the EAV's route information. A CAV may receive the charging-AV dispatch request and calculate a feasible route for the CAV to merge into the EAV's charging range route before the EAV runs out of power. Techniques for determining a feasible route are described in greater detail below, for example, in connection with FIG. 4. For example, the time for the EAV and CAV to reach a merge point may be computed as T_EAV and T_CAV, respectively. A comparison of T_EAV and T_CAV may be performed. If T_EAV>=T_CAV, then the merge point may be considered feasible, as the charging-AV can reach the merge point at or before the time the EAV reaches the merge point.

Assuming a feasible merge point is found, the charging-AV can confirm the charging-AV dispatch request and initiate navigation to the merge point. Accordingly, a charging-AV may take the feasible route and merge into the EAV's charging range route. When the charging-AV and EAV are in close proximity to each other, they may establish communication with each other using C-V2X. Charging-AV may confirm the charging-AV dispatch request with the EAV. Upon confirmation, the charging-AV platoons its back with a small gap behind the EAV and submits a charging platoon request via V2V communications. The EAV may receive the confirmation and charging platoon request and then transmit its maneuver commands via V2V to charging-AV to allow the CAV to automatically follow the same maneuver to keep the small gap for efficient charging. For example, when the EAV changes lanes, corresponding maneuvering commands may be sent to the CAV to allow for the CAV to automatically perform the same maneuverer to keep the gap between the vehicles small for efficient charging. Charging may be performed via physical coupling and/or wireless coupling. When the charging is completed (the EAV has sufficient charge to complete the full route, is charged to a certain threshold, etc.) the charging-AV exits the charging platoon formation and the EAV ceases transmission of maneuver commands. As the EAV and CAV are both autonomous vehicles, electronics communications between EAV and CAV may be used to synchronize their maneuvers via V2V communication. Accordingly, in the manner described above, an EAV may be charged on the road without stopping at a charging station, allowing for continuous deployment and utilization of the EAV for rides.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "electric vehicle" (EV) and the phrase "battery electric vehicle" (BEV) may be used interchangeably in this disclosure and must be understood to refer to any type of vehicle that operates an electric motor by use of a rechargeable battery. The word "battery" as used herein encompasses a single battery as well as a set of batteries that are interconnected to form a battery bank. It must be understood that words such as "implementation," "scenario," "case," "application," and "situation" are to be understood as examples in accordance with the disclosure. It should be understood that the word "example" as used herein is intended to be non-exclusionary and non-limiting in nature.

FIG. 1 illustrates an example environment 100 in which various techniques for electric autonomous vehicle charging assistance may be implemented, according to at least one embodiment.

An electric autonomous vehicle 102 depicted in FIG. 1 may refer to an electric vehicle or battery-powered electric vehicle with autonomous or semi-autonomous driving capabilities. In various embodiments, the electric autonomous vehicle (EAV) depicted in FIG. 1 comprises various electronics such as computer systems, navigation systems, vehicle-to-vehicle (V2V) systems, vehicle-to-everything (V2X) systems, and so forth. An EAV may be characterized by an electric motor. The EAV's motor may be powered by a batteries, fuel cells, or other such means. In accordance with various embodiments, an EAV may comprise one or more rechargeable batteries and a coupling mechanism for charging the batteries. The mechanism may be a physical coupling mechanism and/or wireless coupling mechanism by which a battery's power level may be charged.

In various embodiments, EAV 102 includes electrical circuity that provides for communications with a ride server 104. Ride server 104 may refer to a computer server or servers that are accessible to EAV via a cellular network 106. Ride server 104 may include computer hardware and/or software that is used to coordinate a fleet of vehicles. The fleet may include entirely EAVs, may be a combination of EAVs and human-operated vehicles, and so forth. Ride server may be in communication with a fleet of vehicles, passengers that are using or intending to use the vehicles for transportation, delivery, or other mobility needs, and so forth. Ride server may coordinate and schedule rides for various passengers or users. For example, a user may submit a request to ride server (e.g., via a mobile application installed to a mobile device of the user) and request a ride from one location to another. Ride server may identify a suitable EAV for the user's requested mobility needs and dispatch an appropriate EAV to pickup the user and transport the user to the intended destination. EAV 102 may provide various information to ride server, such as the EAV's location, battery levels, route information, and so forth.

Cellular network 106 depicted in FIG. 1 may be considered a non-limiting, illustrative example of a type of wireless communications network, according to at least one embodiment. Wireless communication signals and/or systems may be implemented in accordance with one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In various embodiments, EAV 102 comprises various sensors, such as a global positioning satellite (GPS) 106, cellular vehicle-to-everything (C-V2X) 108, vehicle-to-vehicle (V2V), and so forth. These are to be considered non-limiting examples of systems that may be utilized by EAV 102. For example, while a GPS receiver may be used, other types of global navigation satellite system (GNSS) receivers are contemplated within the scope of this disclosure, including Galileo, GLONASS, and BeiDou-based satellite navigation systems. While a cellular-based V2X system is depicted in FIG. 1, other types of V2X systems may be used, including any suitable communications link that facilitates vehicle-to-network communications, vehicle-to-vehicle communications, vehicle-to-infrastructure communications, and so forth. GPS 106 may be used to provide location information of the EAV 102 to the ride server 104, the C-AV 116, and any other suitable system that the EAV 102 may interact with.

EAV route information 110 may refer to route information for a current or planned route for EAV 102. For example, a user may submit a request to ride server 104 with a pick up location and a drop off location. EAV 102 may compute EAV route information 110 by determining one or more candidate routes to facilitate transport from the pickup location to the drop off location. The EAV route may be calculated based on various factors, such as distance, traffic, time, cost (e.g., use or avoidance of toll roads) and so forth. In various embodiments, the EAV's power level is monitored to determine its present battery level and estimated battery usage for a planned route.

In various embodiments, the battery level is monitored to determine whether charging services will be needed by EAV 102. For example, if the EAV's battery level falls below a certain threshold, a charging dispatch request may be sent by EAV 102 to ride server 104 via cellular network 106. The battery threshold for issuing a charging request may be determined based on a current battery level, an expected battery level based on EAV route information 110, road condition, weather such as temperature and wind, air condition usage in EAV, and so forth. In some cases, different types of charging requests may be issued. For example, if the EAV's battery level is not sufficient to complete the planned route, then a high priority or critical charging request may be sent, whereas if the battery level is estimated to be sufficient to complete the ride, then the charging request may be sent at a lower priority.

In various embodiments, charging request comprises information regarding the EAV's transit route. For example, the charging request may include full route information from the pickup location to the drop off location. A charging route may refer to a portion of the route over which EAV 102 requests to receive charging services. For example, if EAV 102 has sufficient battery power for only 75% of a planned route, the first 75% of the route may be indicated as a charging route.

EAV 102 may send a charging request to ride server 104 via cellular network 106. The charging request may provide some or all of the EAV's route information, such as the EAV's current position, its planned route to a destination, its charging range, current battery level, expected battery usage, and so forth. Charging range may refer to a portion of the EAV's planned route that the EAV's battery level is estimated to be able to accommodate. For example, based on the historical battery drain rate with current road condition and environment and A/C usage, the EAV 102 may calculate how much longer the battery will last, and based on the estimated time to arrive at the destination, determine whether the full route can be traversed or only part of it.

Ride server 104 may be operable to receive charging requests from EAV 102, which may be one among several EAVs of a fleet of vehicles providing ride services. Ride server 104 may have communications access to one or more charging AVs, such as charging-AV 116 depicted in FIG. 1. A charging-AV 116 may refer to a type of autonomous vehicle that has the capability to charge EAV 112, for example, using a wireless or plugin method. In some embodiments, charging-AV has a gas generator to generate AC power for charging.

Based on the charging request, ride server 104 may use charging-AV dispatch request to dispatch a suitable charging-AV such as charging-AV 116 depicted in FIG. 1 to provide charging services to EAV 102. Charging-AV 116 may compute a best route that allows for charging-AV to merge into the EAV"s charging range route. Charging-AV 116 may use comprise GPS 118 and C-V2X 120 modules. GPS 118 may refer to a GPS receiver that C-AV 116 uses to determine its current location. C-V2X 120 may refer to a communications module that is used to communicate with ride server 104, for example, to receive charging-AV dispatch requests.

EAV 102 may comprise charging coil 112 and vehicle-to-vehicle (V2V) communications 114 for communication with a charging-AV (C-AV). Charging coil 112 may refer to any suitable mechanism for charging an EAV, such as wireless and physical coupling mechanisms. V2V 114 communications may be used for EAV 102 to communicate with C-AV 116 to provide charging services.

Charging-AV 116 may calculate C-AV route information 122. In various embodiments, calculating C-AV route information 122 comprises calculating a merge route and/or merge point to intercept EAV 102. In various embodiments, charging-AV 116 selects a merge point based on the EAV's route information. Charging-AV 116 may furthermore calculate the route and time for EAV to reach the merge point, T_EAV. Charging-AV 116 may furthermore calculate the route and time for charging-AV to arrive at the merge point, T_CAV. If T_EAV<T_CAV, then the merge point may be considered infeasible, as the charging-AV would reach the merge point after the EAV. Conversely, if T_CAV >=T_EAV, then the merge point may be considered feasible as the charging-AV may be able to reach the merge point at or before the time that the EAV reaches the candidate merge point. In some embodiments, adjustments may be made to various navigation parameters to make a candidate merge point feasible. For example, if charging-AV is able to take a faster route, increase its speed (within regulation and safety parameters), a merge point may be determined to be feasible with the adjusted navigation parameters. In some embodiments, charging-AV 116 may provide a request to EAV 102 to reduce its speed in order to make a merge point feasible. This option may be considered, at least in some embodiments, when other candidate merge routes are considered infeasible, as it may be undesirable to cause delays to EAV's route, especially when passengers are aboard EAV 102 on route to a destination.

Charging-AV 116 may reach the determined merge point and merge into the EAV's route. When EAV 102 and charging-AV 116 are in close proximity to each other, the charging-AV may communicate with EAV via a V2V or V2X module and establish a communications link. Charging-AV may platoon its back with a small gap behind the EAV to form a charging platoon via V2V communications. The EAV may receive a charging platoon request and the charging platoon may be established. When autonomous vehicles are platoons, maneuvering commands may be shared between the autonomous vehicles to allow for the platooned vehicles to stay in close proximity to each other and move in concert with each other. For example, if EAV 102 shifts lanes, it may transmit maneuver commands to charging-AV 116 to allow for the charging-AV 116 to automatically follow the same maneuver to maintain the a small gap between the vehicles, for example, for efficient wireless charging. In some embodiments, such as those in which platooned vehicles are physically coupled, V2V communications may be used to facilitate maneuvers by temporarily decoupling the vehicles to allow for the maneuver to be performed, and then re-couple the vehicles together once the maneuver is completed. For example, if EAV 102 is physically coupled with charging-AV 116 for efficient charging, the vehicles may be temporary de-coupled when EAV 102 to allow for EAV 102 to shift lanes. When EAV 102 shift lanes, charging-AV 116 may also shift lanes. Once the shift has completed, EAV 102 and charging-AV may again be physically coupled to allow for charging to resume. In various embodiments, an electric vehicle and a charging vehicle are both autonomous vehicles that are able to communicate with each other V2V communications, there by allowing the vehicles to easily synchronize their maneuvers via V2V communications and provide for efficient charging.

In various embodiments, charging-AV 116 provides charging services to EAV 102. The EAV's battery may be charged to any suitable battery level. For example, EAV 102 may be charged to a threshold level that is sufficient to complete its current route. In some embodiments, the battery is charged to a predetermined level—30%, 40%, 50%, 60%, 70%, 80%, 90%, 100%, and so forth. In various embodiments, the amount of charging services that charging-AV is able to provide and/or overall demand for charging services among a fleet of EAVs managed by ride server 104 may be used to determine how much charging services to provide to EAV 102. For example, if the amount of charging services needed across a fleet of EAVs is high relative to the amount of charging-AVs available, then EAVs may be provided sufficient charging services to complete its route—for example, charged to 40%—rather than completely charging the EAV 102, as the charging capabilities of the charging-AVs may be needed to provide charging services to other EAVs of the fleet of EAVs.

Techniques described above in connection with FIG. 1 should be considered illustrative in nature and non-limiting in scope, unless otherwise made clear by the context of the disclosure. Various techniques described in connection with FIG. 1 may be applied in connection with embodiments described below in connection with FIGS. 2-5. Techniques described below in connection with FIGS. 2-5 may be applicable in the context of FIG. 1.

Figure 2:
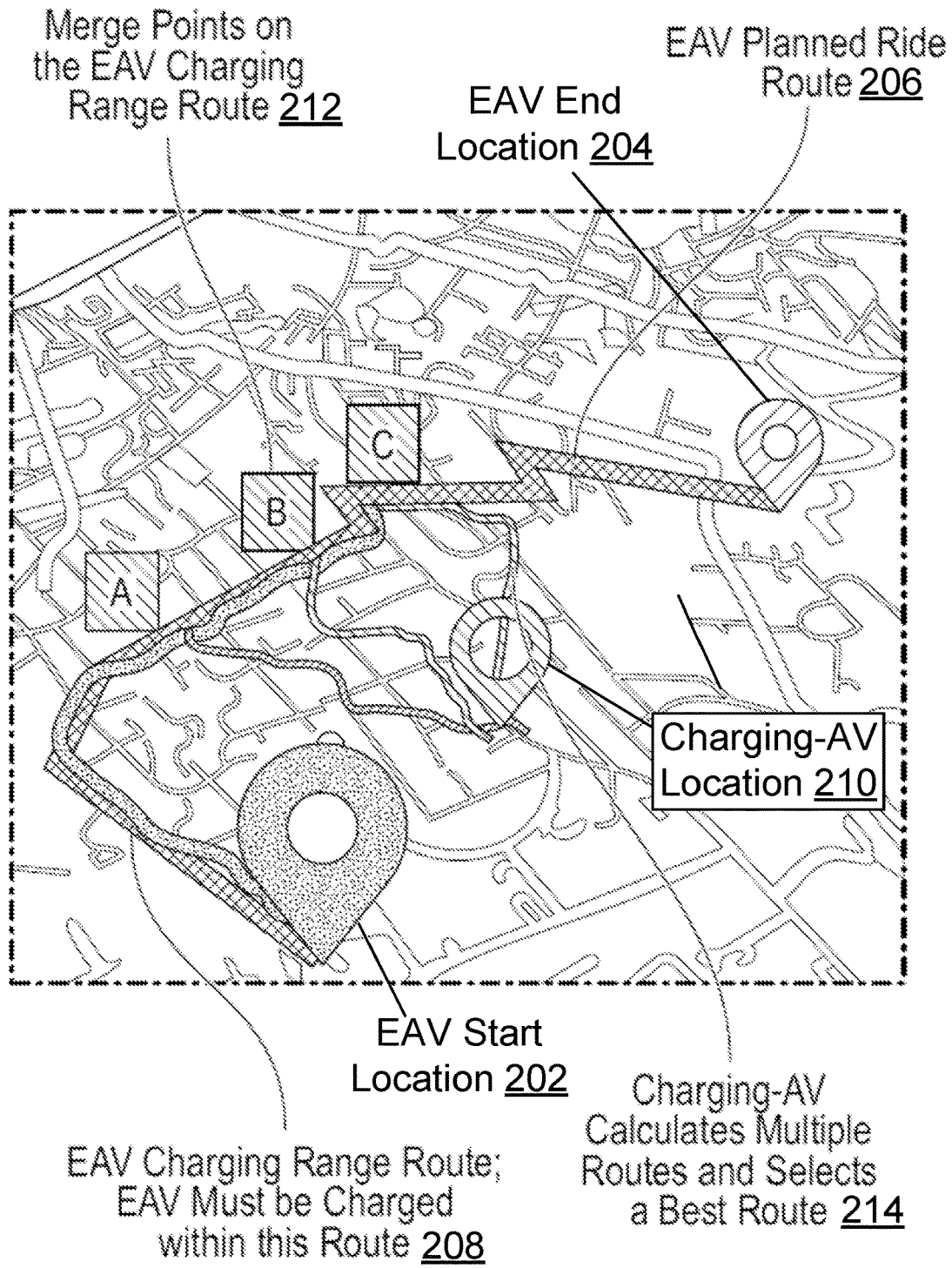
FIG. 2 is a schematic diagram of components of the architecture of FIG. 1.

FIG. 2 illustrates a diagram in which an EAV and charging-AV may coordinate routes to deliver charging services. EAV start location 202 may refer to a pickup location or start location where an EAV is, was, or plans to be. EAV end location 204 may refer to a destination that the EAV is in transit to or plans to travel to. In various embodiments, EAV end location 204 is a user-specified destination. For example, an EAV may be dispatched by a ride server to provide ride services to a user by picking up the user at EAV start location 202 and charting a course to EAV end location 204. The route that EAV takes or plans to take from EAV start location 202 to EAV end location 204 may be referred to as EAV planned ride route 206. The planned ride route may include information such as specific streets or GPS coordinates that the EAV is taking or plans to take for a ride service. In various embodiments, EAV charging range route 208 refers to a route or portion thereof over which an EAV must be charged over. For example, if the EAV is running low on batteries or is estimated to run out of battery power prior to reaching EAV end location 204, the EAV charging range route may be determined as an estimate of how far along the route 206 the EAV can travel before needing additional power. In some embodiments, the charging range route is determined to be the route over which an EAV can travel before taking a precautionary measure. For example, EAV charging range route 208 may be calculated based on estimated battery usage rate, distance, and then also the location of changing stations such that if charging services are not provided during EAV charging range route 208, the EAV still has sufficient battery to initiate a detour of the ride service to reach a charging station and receive charging services at the charging station. This may be considered as a contingency or backup option in case a charging-AV cannot be reached to provide charging services during the EAV charging range route 208.

Charging-AV location 210 may refer to the location of a charging autonomous vehicle. A charging-AV receives a dispatch request, that comprises route information of an EAV requesting charging services. The request may include information such as the EAV start location 202, EAV end location 204, EAV planned route 206, EAV charging range route 208, and combinations thereof. Charging-AV may receive a dispatch request and determine one or more merge points along the EAV charging range route 208. Charging-AV may calculate multiple routes and select a best route 214. The best route may be selected based on various criteria, such as fastest route, quickest merge, and so forth. For example, FIG. 2 illustrates an example in which three candidate merge points labeled as A, B, and C. Each respective candidate merge point may refer to a point where a charging-AV may reach EAV's charging range route 208.

In various embodiments, the time to reach candidate merge points is computed. For example, time to reach merge points A, B, and C depicted in FIG. 2 may be computed. Additionally, the time for EAV to reach the candidate merge points may also be computed. If the charging-AV is estimated to reach the merge point after EAV, it may be considered an infeasible or unsuitable merge point, as the EAV will have already passed that location by the time charging-AV reaches such merge point. However, if charging-AV is estimated to reach the merge point before EAV, it may be considered a feasible or suitable merge point. For example, charging-AV may reach a feasible merge point prior to the EAV and then either wait at the merge point for EAV to arrive or EAV may merge into the EAV's planned route and decrease its speed until EAV catches up.

As an illustrative example, consider candidate merge points A, B, and C depicted in FIG. 2. For the sake of example, consider that charging-AV can reach each of the merge points in 15 minutes. Additionally, as depicted in FIG. 2 and for the sake of example, consider that EAV reaches merge point A after 10 minutes, reaches merge point B after 20 minutes, and reaches merge point C after 30 minutes. Merge point B may be considered the best merge point in such an example because it refers to the earliest point at which charging-AV can reach EAV. In this example, merge point A would be infeasible because charging-AV would reach merge point A five minutes after EAV passed that location. Additionally, merge point B may be considered to be a better or more suitable merge point that merge point C because the charging-AV is able to reach the EAV sooner by taking merge point B and can provide more charging time than if merge point C were selected. Regardless, the charging-AV may attempt to ensure that EAV is provided with sufficient power to reach EAV end location 204. In some embodiments, a relay of C-AVs is used to ensure that EAV is able to reach EAV end location 204. For example, on a prolonged trip, a first C-AV may charge the EAV (e.g., fully charged) along a charging range route when the EAV's battery level falls below a threshold level. This charge may still be insufficient to reach the EAV end location 204, for example, in the case where the distance from the charging range route to the end location still exceeds the EAV's total range. In such an example, the EAV may continue travelling towards the EAV end location 204 and when the EAV's battery level again falls below the threshold, an updated charging route may be computed and a second C-AV may be dispatched to charge the EAV. This may be repeated for a third, fourth, fifth, etc. C-AV to further extend the EAV's range. In this manner, the EAV may be able to travel a much farther distance than the maximum range allowed by its battery.

Figure 3:
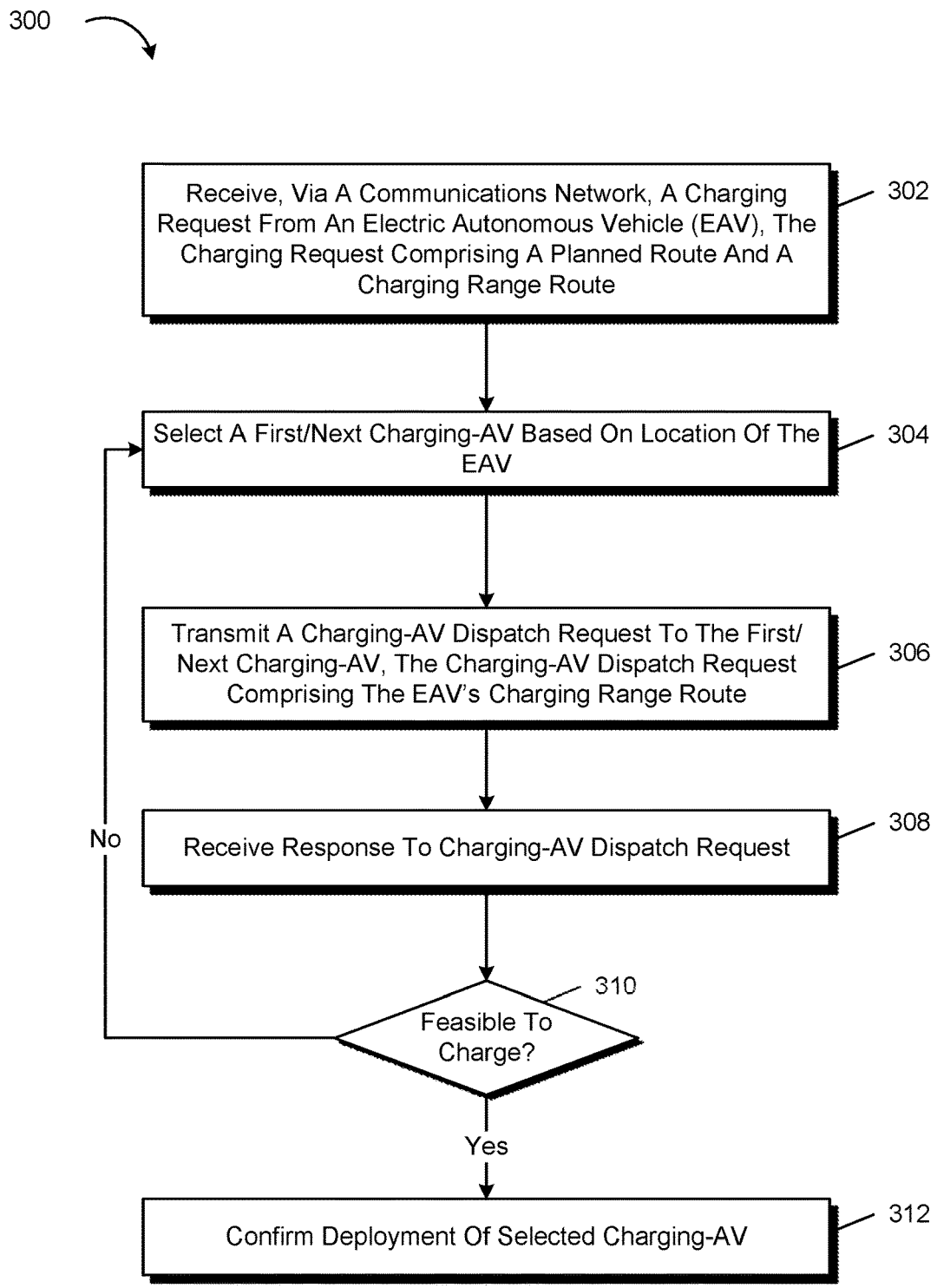
FIG. 3 is a perspective view of an example scenario for a drone operating over a public roadway.

FIG. 3 shows an illustrative example of a process 300 for providing charging services, in accordance with one or more example embodiments of the present disclosure. In at least one embodiment, some or all of the process 300 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 300 may be implemented in the context of various systems and methods described elsewhere in this disclosure, such as those discussed in connection with FIGS. 1 and 2. In at least one embodiment, process 300 or a portion thereof is implemented by a ride server.

In at least one embodiment, process 300 comprises a step to receive, via a communications network, a charging request from an electric autonomous vehicle (EAV), the charging request comprising a planned route and a charging range route 302. In various embodiments, ride server receives a planned ride route from an EAV and a charge range route. The charge range route may be implied. For example, ride server may receive a planned ride route and battery power level of an EAV. Ride server and/or EAV may determine an approximate drive range for the EAV based on its battery level, expected power usage, and so forth. In various embodiments, a determination is made to provide charging services to EAV. In some cases, the EAV makes the determination, in some cases, the ride server makes the determination. Ride server may manage a fleet of charging autonomous vehicles (C-AVs) that are used to deliver power to a fleet of EAVs to allow for the EAVs to provide continuous or near continuous ride services. In other words, EAVs may be charged while providing ride services, reducing or eliminating the need for EAVs to sit or idle at a charging station. Accordingly, the utilization of EAV resources may be improved by reducing the amount of time that they spend parked to charge.

In various embodiments, process 300 comprises a step to select a first charging-AV based on location of the EAV 304. In some cases, the closes C-AV is selected. In some cases, C-AV is selected to provide optimal charging services to multiple EAVs requesting charging services. For example, when multiple EAVs are requesting charging services, C-AVs may be dispatched in a manner to minimize the total travel time for the C-AVs to collectively reach the respective merge points of the multiple EAVs.

In various embodiments, process 300 comprises a step to transmit a charging-AV dispatch request to the first charging-AV, the charging-AV request comprising the EAV's charging range route. The charging-AV may make a determination as to whether a feasible merge point can be located, which may utilize various V2X communications, such as vehicle-to-infrastructure communications, to determine whether any feasible merge points can be identified based on real-time traffic and road conditions, etc. In various embodiments, the first charging-AV sends a response to the ride server either confirming a feasible route has been found or that a feasible route has not been found. Techniques described in connection with FIG. 4 may be utilized to generate the response. The ride server may receive a response to charging-AV dispatch request 308.

In various embodiments, process 300 comprises a step to determine whether 310 it is feasible to charge the EAV with the first charging-AV. The determination may be based on the response received from charging-AV. If the charging-AV confirms that charging is feasible, process 300 may proceed to a step to confirm 312 deployment of the selected charging-AV. The confirmation may be provided to the EAV. The confirmation may include information regarding the location of the charging-AV, the merge point, an estimated time for charging services to be provided, and various other charging service related information. However, if the first charging-AV indicates that charging is not feasible, steps 304-310 may be repeated for a second charging-AV, third charging-AV, and so forth, until a charging-AV is able to confirm that charging is feasible.

Figure 4:
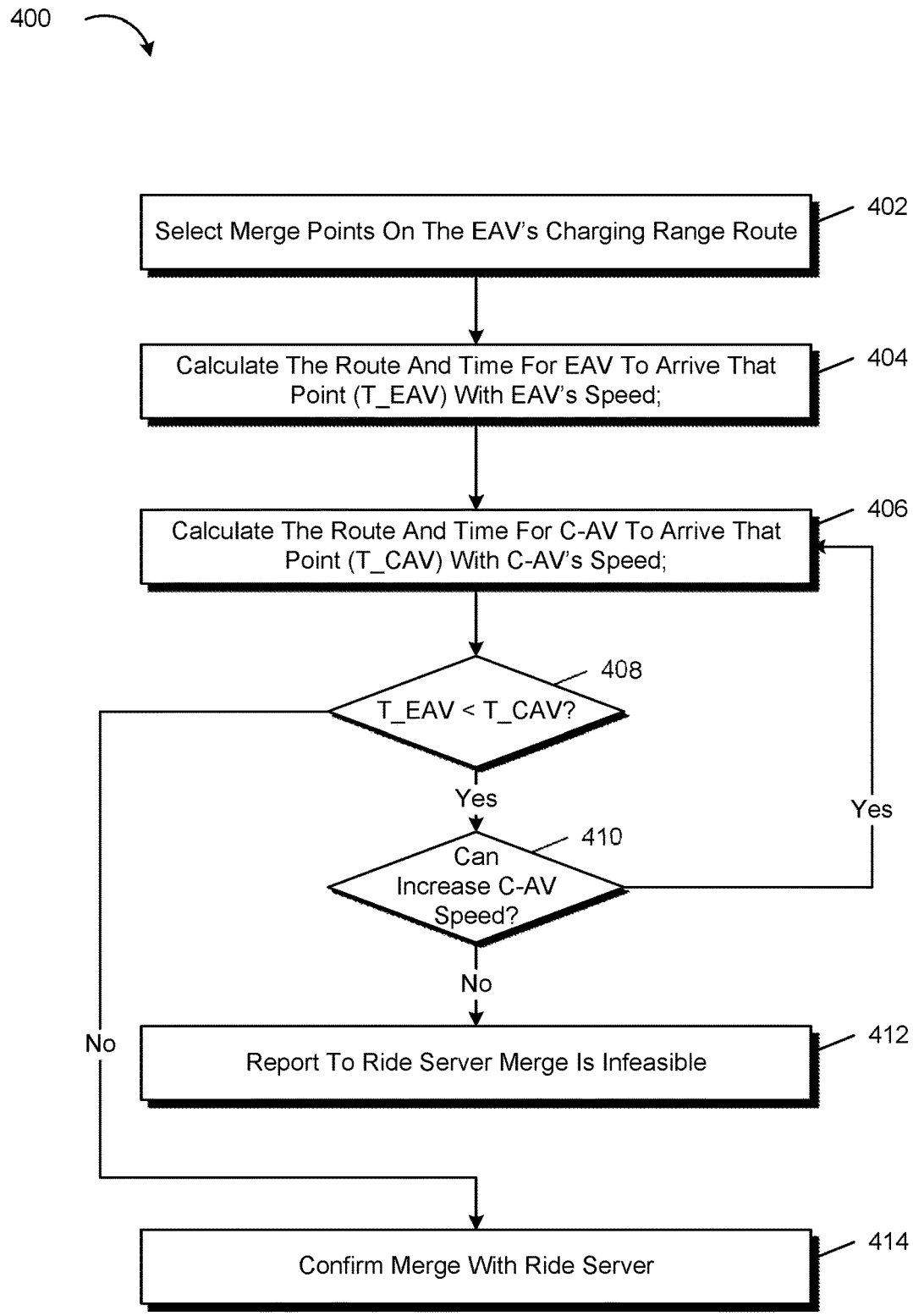
FIG. 4 is a flowchart of an example method of the present disclosure.

FIG. 4 shows an illustrative example of a process 400 for determining a suitable merge point for in-transit charging services, in accordance with one or more example embodiments of the present disclosure. In at least one embodiment, some or all of the process 400 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 400 may be implemented in the context of various systems and methods described elsewhere in this disclosure, such as those discussed in connection with FIGS. 1 and 2. In at least one embodiment, process 400 or a portion thereof is implemented by a charging autonomous vehicle (C-AV).

In at least one embodiment, process 400 comprises a step to select a merge point on the EAV's charging range route 402. In various embodiments, a ride server provides an EAV's charging range route to a C-AV. The C-AV may identify one or more merge points. Merge points may be points along roads in which a C-AV may reach the planned route of an EAV.

In various embodiments, process 400 comprises a step to calculate 404 the route and time for the EAV to reach the merge point with the EAV's speed, which may be denoted as T_EAV. In various embodiments, T_EAV is calculated by C-AV based on various information available provided by the EAV, which may include information regarding the planned route, such as real-time traffic information or estimates of how long it will take the EAV to take the planned route.

In various embodiments, process 400 comprises determining, for a candidate merge point, a route and amount of time for the C-AV to reach the merge point 406. This time may be referred to as T_CAV. Process 400 may comprise a step to determine whether 408 the C-AV can reach the merge point before EAV reaches the merge point. This may be determined based on the estimated times to reach the merge point for EAV and C-AV, T_EAV and T_CAV respectively.

If the C-AV is expected to reach the merge point first, it is considered a feasible merge point, and process 400 may proceed to a step to confirm the merge with ride server 414. The confirmation may indicate that a C-AV has confirmed the charging request and is traveling to the merge point to intercept the EAV. However, if the EAV is expected to reach the merge point first, process 400 may proceed to a step to determine whether 410 the C-AV can increase its speed. If so, then T_CAV may be recomputed with the increased speed of the C-AV to determine an updated T_CAV'. If T_CAV' is able to be reduced so that the C-AV is able to reach the merge point before or concurrent with the EAV, then the candidate merge point may be confirmed. However, if the C-AV's speed cannot be safely and lawfully increased (e.g., in compliance with all transportation laws and regulations in a safe manner), then the system may proceed to report to the ride server that merge is infeasible 412.

In various embodiments, multiple candidate merge points may be identified, and the merge points may be examined to determine whether any feasible merge points can be identified. If none of the merge points are feasible, then a report may be sent to the ride server to indicate that charging services cannot be provided by the C-AV, and ride server may attempt to dispatch another C-AV to provide charging services to the EAV. If multiple candidate merge points are identified as being suitable, the best merge point may be selected. The best merge point may be selected as the earliest point at which the C-AV is able to reach the EAV and provide charging services.

Figure 5:
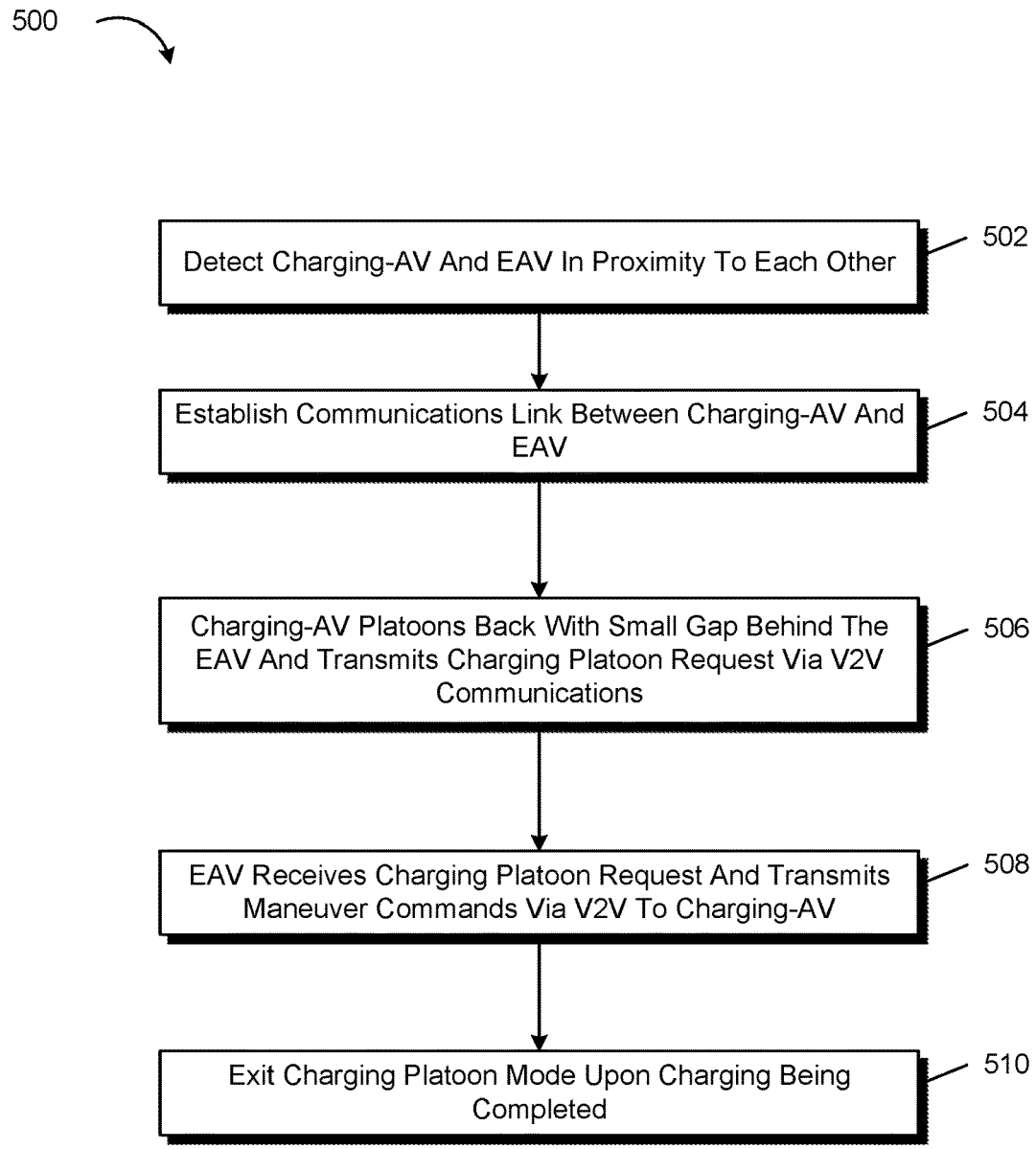
FIG. 5 is a flowchart of another example method of the present disclosure.

FIG. 5 shows an illustrative example of a process 500 for coordinating in-transit charging services between an electric autonomous vehicle (EAV) and charging autonomous vehicle (C-AV), in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non- transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 1 and 2. In at least one embodiment, process 500 or a portion thereof is collectively implemented by an EAV and C-AV in communication with each other, for example, using V2V communications.

In various embodiments, process 500 is performed in response to a charging request by EAV and charging-AV dispatch request that is confirmed by C-AV. The C-AV may receive information regarding the EAV's planned route and/or charging range route and determine a merge point. When C-AV reaches the merge point, the C-AV may merge into the C-AV's planned route, and slow down or stop at a point along the planned path if EAV has been delayed and/or has not yet reached the merge point.

In various embodiments, process 500 comprises a step to detect charging-AV and EAV are in proximity to each other 502. In various embodiments, short-range communications sensors may be used to ascertain the relative location of C-AV and EAV. In various embodiments, infrared (IR) or other short range sensors are used to detect C-AV and EAV are in close proximity to each other. In some embodiments, C-AV uses camera sensors to obtain visual identification of EAV, for example, by computer vision processing techniques to identify a license plate belonging to EAV. The ride server may provide identification information of the EAV to the C-AV so that the EAV and/or the C-AV may be able to determine when they are in close proximity to each other and initiate V2V communications.

In various embodiments, a communications link is established between C-AV and EAV 504. The communications link may, for example, be a V2V communications link. When the C-AV is close to EAV, it may communicate with EAV via C-V2X and confirm with the EAV that charging services are requested. The EAV may confirm the request.

In various embodiments, process 500 comprises a step in which charging-AV platoons back with small gap behind the EAV and transmits charging platoon request via V2V communications to EAV 506. While in a charging platoon formation, the charging-AV and EAV may attempt to maintain a close distance to each other to allow for physical and/or wireless coupling of a battery charger with the EAV's battery system.

In various embodiments, process 500 comprises a step in which EAV receives charging platoon request and transmits maneuver commands via V2V to charging-AV 508. EAV may receive the confirmation and charging platoon request. EAV and C-AV may engage a charging platoon formation wherein EAV transmits its maneuver commands vis V2V communications to charging-AV to allow for the charging-AV to automatically follow the same maneuvers as the EAV. Movement of the EAV and C-AV may be synchronized. For example, if EAV shifts lanes, a corresponding maneuver command may be sent to the C-AV to allow for the C-AV to follow closely behind. As the EAV and C-AV both have autonomous capabilities, their movements, speed, and maneuvers may be synchronized to maintain a close distance, which may provide for more efficient charging.

In various embodiments, the C-AV and/or EAV disengage charging platoon formation upon charging being completed. EAV's battery may be charged to any suitable battery level upon completion of charging services. For example, EAV may be charged to a threshold level that is sufficient to complete its current route. In some embodiments, the battery is charged to a predetermined level— 30%, 40%, 50%, 60%, 70%, 80%, 90%, 100%, and so forth. In various embodiments, the amount of charging services that charging-AV is able to provide and/or overall demand for charging services among a fleet of EAVs managed by ride server may be used to determine how much charging services to provide to EAV. For example, if the amount of charging services needed across a fleet of EAVs is high relative to the amount of charging-AVs available, then EAVs may be provided sufficient charging services to complete its route—for example, charged to 40%—rather than completely charging the EAV 102, as the charging capabilities of the charging-AVs may be needed to provide charging services to other EAVs of the fleet of EAVs.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method comprising:
   receiving a first message from a first vehicle, the first message including information about a start location, an end location, a first route from the start location to the end location, and a battery charge level of the first vehicle;
   determining a first location along the first route;
   determining a second route for a second vehicle to rendezvous with the first vehicle at the first location;
   causing the second vehicle to travel to the first location; and
   causing the second vehicle to wirelessly transfer power to the first vehicle while both the first vehicle and the second vehicle are in motion,
   wherein determining the first location further comprising:
      determining a first candidate location and a second candidate location along the first route;
      determining a first time for the first vehicle to reach the first candidate location;
      determining a second time for the first vehicle to reach the second candidate location;
      determining a third time for the second vehicle to reach the first candidate location;
      determining a fourth time for the second vehicle to reach the second candidate location; and
      determining, based on the first time, the second time, the third time, and the fourth time, the first candidate location or the second candidate location as the first location;
      determining that first time is less than the second time;
      determining that the fourth time is more than the first time and less than the second time; and
      selecting the second candidate location as the first location,
   wherein prior to selecting the second candidate location as the first location, the method further comprising:
      determining a third candidate location along the first route;

determining a fifth time for the first vehicle to reach the third candidate location, wherein the fifth time is more than the second time;

determining that the fourth time is less than fifth time; and determining that a charging time at the second candidate location in more than a charging time at the third candidate location.

* * * * *